May 26, 1942.                J. R. MacKAY                2,284,476
                          VOLTMETER APPARATUS
                         Filed May 31, 1938              4 Sheets-Sheet 1

INVENTOR
John R. MacKay
BY
Cooper, Kerr & Dunham
ATTORNEYS

May 26, 1942.  J. R. MacKAY  2,284,476
VOLTMETER APPARATUS
Filed May 31, 1938  4 Sheets-Sheet 2

INVENTOR
John R. MacKay
BY
Cooper, Kerr + Dunham
ATTORNEYS

May 26, 1942. J. R. MacKAY 2,284,476
VOLTMETER APPARATUS
Filed May 31, 1938 4 Sheets-Sheet 3

INVENTOR
John R. MacKay
BY
Cooper, Kerr + Dunham
ATTORNEYS

Patented May 26, 1942

2,284,476

UNITED STATES PATENT OFFICE 2,284,476

VOLTMETER APPARATUS

John R. MacKay, West Caldwell, N. J., assignor to Wallace & Tiernan Products, Inc., Belleville, N. J., a corporation of New Jersey Application May 31, 1938, Serial No. 210,984

26 Claims. (Cl. 171—95)

This invention relates to vacuum tube voltmeters and one of its primary objects is to provide an indicating or recording voltmeter system which will be extremely sensitive and which will require practically no flow of current from the source of potential being measured. Thus an important application of the invention is in the measurement or recording of small voltages or small voltage changes produced by the types of electrodes or cells which are used for the determination of pH values, and which may have an internal resistance in the neighborhood of five million to hundreds of millions of ohms.

Attempts to measure the voltage of such cells have been made with sensitive but expensive galvanometers employed as "null" indicators in direct current potentiometer circuits—an unsatisfactory system because an appreciable, though minute, current was needed up to the point of perfect balance. Vacuum tube balance indicators, operating on direct current, have also been used, wherein by repeated manual operation of a switch, a condenser is intermittently charged with the "difference" voltage (between known and unknown), and discharged into a vacuum tube amplifier. A series of corresponding momentary deflections of a sensitive meter in the amplifier output are produced, and during the operations, the input potentiometer is manually adjusted until the meter deflections cease—the known voltage being then equal and opposite to the unknown. Although sensitive, such devices are objectionable: for example, they require painstaking care to balance—indeed, a special operating techinque must be learned; and they are not only slow in operation, but their fidelity is seriously affected by the so-called "drift," characteristic of the D. C. type of amplifier necessarily used. Furthermore, the nature of the indication, and the method of obtaining it, are such that these prior types of apparatus do not lend themselves to automatic, continuous recording of voltages, or to similar continuous registration desirable in apparatus for controlling processes to maintain a specific pH value, or more particularly to maintain a desired electromotive force at a glass electrode or similar cell in contact with the controlled liquid or gas.

The present invention relates generally to what may be called alternating current types of vacuum tube "null" indicators; that is, voltmeter apparatus in which the difference between the known and unknown electromotive forces is given an appropriate modulation and applied to the grid of the first amplifier tube. Important objects of the invention accordingly include the provision of improved devices of that type, which are ultra-sensitive and which avoid the deleterious effects due to changing vacuum tube characteristics, varying interstage voltages in the amplifier, and other factors that adversely influence the direct current type of vacuum tube voltmeters. Another object is to provide simple, efficient and highly accurate arrangements for the automatic indication, recording or control of values that are preferably or necessarily derived from cells or electrodes of very high impedance, and for the determination of voltage values of sources from which no current can be drawn. For example, with the embodiments of the invention hereinafter described, successful control and continuous deflection of an indicating device has been obtained upon the application of less than 0.5 millivolt through a total input resistance of two billion (2,000,000,000) ohms.

Further objects include the provision of improved vacuum tube voltmeter systems: which are rapid in action; which are relatively inexpensive; and which may be operated or energized from an ordinary alternating current line without being substantially affected by normal line voltage fluctuation. Another primary object of the invention is to provide effective and highly sensitive arrangements whereby minute voltage changes, as from a simple direct current source, are utilized for the phase control of an alternating current motor in both direction and speed— such motor serving, for example, to operate a voltage recording device, process control mechanism, or other apparatus.

Other objects and advantages include those which are hereinafter stated or apparent, or which are incidental to the invention. The nature of the latter will be conveniently explained by reference to the following description and accompanying drawings, which set forth, by way of example, certain presently preferred embodiments of the invention.

Figures 1, 2, 3, 4, 5:
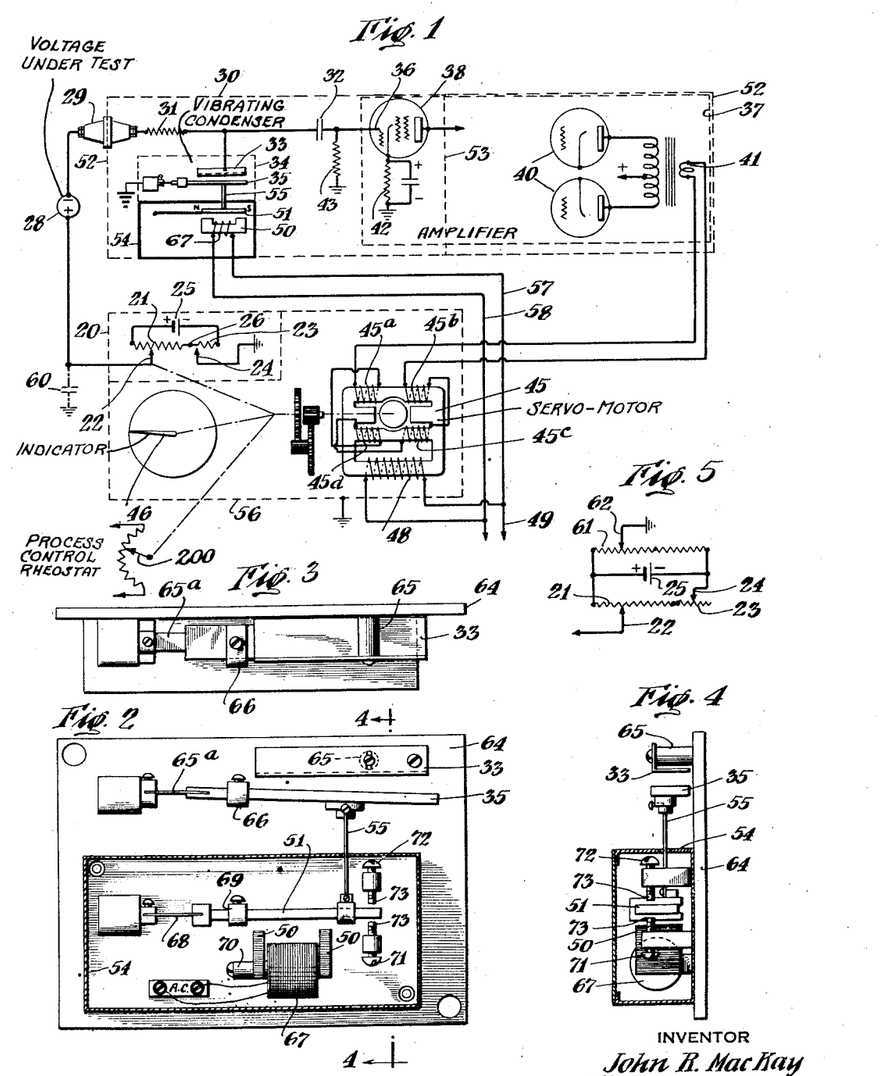
Figure 1 is a schematic wiring diagram of a voltmeter system embodying the invention.
Fig. 2 is a plan view of a vibrating condenser device employed in the apparatus of Fig. 1.
Figs. 3 and 4 are respectively a side elevation and a section on line 4—4, of the device shown in Fig. 2.
Fig. 5 is a modified potentiometer arrangement for use in the voltmeter system.

Referring first to Figure 1, the system conveniently includes a potentiometer device generally designated by an enclosing box 20, and having a slide wire resistor which may comprise a control resistance 21 in series with a calibrating or adjusting resistance 23, the resistances being respectively provided with movable contacts 22, 24. Between the outer ends of resistances 21 and 23, there is connected a source of voltage 25, conveniently comprising a standard cell or battery of standard cells; the potentiometer arrangement being susceptible of accurate calibration, as will now be understood, so that the voltage or potential intermediate each of the contacts 22, 24, and the point of connection 26 of the resistances, can be known for any adjustment of either contact.

One of the contacts or arms, such as contact 24, is conveniently connected to ground and the other contact or arm 22, is connected to one side of the source of unknown voltage, for example, a cell 28, including a rugged glass electrode, for pH determination. The other lead from the electrode 28 passes through an insulator 29 in the shielding structure 30 hereinafter described, and is connected, through a high resistance 31, say of the order of 1000 megohms, to one side of a condenser 32 and also to the stationary plate 33 of a vibrating condenser generally designated by its enclosing shield 34. The movable plate 35 of the vibrating condenser is connected to ground, and the opposite plate of the condenser 32 is connected to the control grid 36 of the first or voltage amplifier tube of a vacuum tube amplifier generally designated by the box 37.

The amplifier 37 may be of any suitable type, preferably such as to respond to a relatively minute alternating or pulsating input voltage, and thereby to produce, in its output, an alternating current corresponding in frequency and phase. As stated, amplifiers of this type are well known, and in consequence the internal connections of the amplifier and likewise its connections to the required sources of energy are conveniently omitted from the drawing. As illustrated, the input voltage amplifier tube is advantageously a so-called pentode, i. e., a 5-element tube, such as the type commercially known and available as R. C. A. 67J–G. Preferably, the input tube 38 is of the type having a glass envelope, rather than one of metal, so as to provide maximum insulation resistance between ground and the cap which connects to the control grid 36. The output stage of the amplifier is generally indicated as including a pair of vacuum tubes 40, 40, connected in push-pull to an output transformer, the secondary 41 of which is connected as hereinafter described. By virtue of the usual biasing resistance 42 intermediate the cathode of the input tube 38 and ground, normal negative potential is applied to the control grid 36.

For stabilizing purposes, as hereinafter explained, a grid or bleeder resistance 43, having the value of, say, 50 to 200 megohms, depending upon other constants of the circuit, is connected between the control grid 36 and ground.

The movable contact 22 of the potentiometer is adapted to be driven, i. e., moved along the resistance 21 in either direction, by a mechanism which is actuated by or under control of the amplifier output secondary 41. In the example shown, the actuating mechanism for the potentiometer arm 22 comprises a shading coil motor 45 having a rotor of the squirrel cage type connected through suitable gearing to the potentiometer arm, and also to an indicating, recording or controlling device conveniently represented as a dial indicator 46. The shading coil motor 45 has a field winding 48 connected across an alternating current line 49, and a plurality of shading coils 45a, 45b, 45c and 45d, which are normally opposed in electrical effect, so as to keep the rotor stationary when no external current is applied to them, but which are so connected (advantageously in series) to the output secondary 41, that in accordance with the phase relationship between the alternating current in secondary 41 and that from the line 49, the electromotive forces normally induced in one set of shading coils (45a—45c or 45b—45d) are assisted and the electromotive forces normally induced in the other set of shading coils (45b—45d or 45a—45c) are opposed and preferably overcome, by the electromotive force set up in secondary 41—whereby rotation of the rotor is produced in one direction or the other depending on the phase relation between the current from secondary 41 and that from line 49. Although four shading coils are shown, connected as normally opposing sets, it will be understood that in some cases more or less than four coils may be satisfactorily employed.

Figure 14:
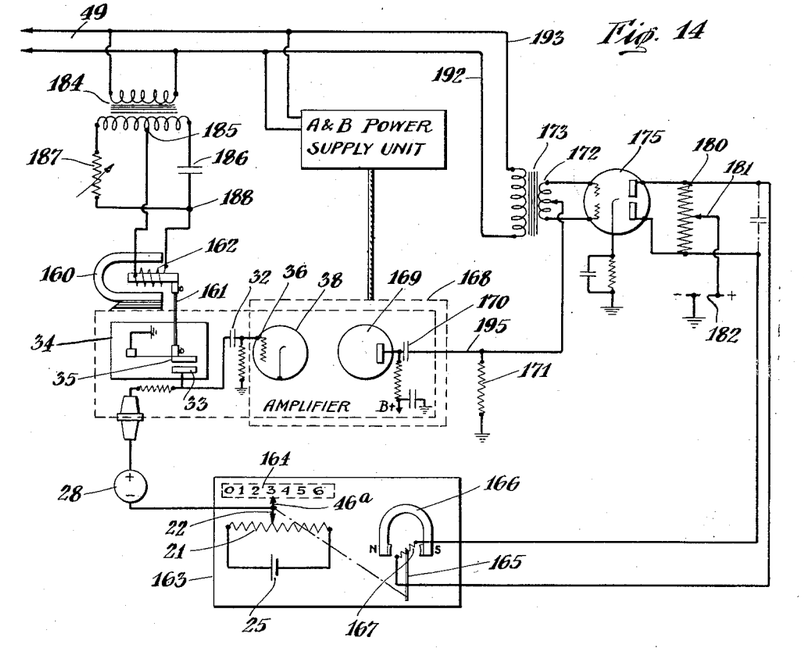
Fig. 14 is a schematic wiring diagram of another modified form of voltmeter system.
Figure 15:
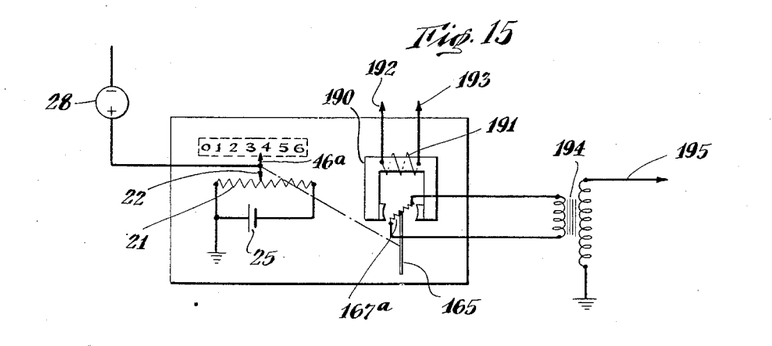
Fig. 15 is a schematic diagram of certain further modifications of the system, particularly in reference to Fig. 14.

Suitable amplifier-controlled shading coil motor apparatus of this type is described in my co-pending application Serial No. 74,895, filed April 17, 1936 for Motor control apparatus. Although I at present generally prefer to use a motor of this type, since it requires little amplifier output for its positive operation, is essentially non-hunting, and is extremely sensitive to changes of voltage and phase, other types of motors or actuating devices may be satisfactorily used, for example, arrangements as illustrated in Figs. 14 and 15.

The movable plate 35 of the vibrating condenser 34 is adapted to be vibrated at the frequency of the alternating current line 49 by an electromagnetic device comprising an electromagnet 50 energized from the line, and an armature 51 connected to the plate 35.

Before describing further details of preferred construction, it will be convenient to explain the manner of operation of the system (as exemplified in Fig. 1), and what I now believe to be its underlying theory or principle. Assume at first that the electrode or other unknown voltage source 28 is omitted, i. e., replaced by a straight connection from resistance 31 to potentiometer arm 22, and that both contact arms 22 and 24 are at the connecting point 26 so that no potential is applied from the potentiometer. The control grid 36 of the tube 38 tends to charge itself and the condenser 32 to a floating grid potential, which will depend in value, as will be readily understood, upon the characteristics of the type of vacuum tube employed and the voltages applied to its electrodes. In practice, it has been found that this grid potential may be stabilized to a marked degree by the use of the resistor 43, although in some cases satisfactory and highly sensitive, although somewhat less reliable operation, may be obtained with the resistor 43 omitted. In any case, under the assumed conditions, the only difference of potential in the input circuit will be as stated, between the grid 36 and cathode of the tube 38, and consequently across condenser 32, which will thus tend to charge through the high resistance 31.

Assuming, however, that the vibratory modulator condenser 34 is now operating, the voltage across the condenser 32 cannot attain a steady D. C. value, but instead reaches an average A. C. value equivalent or proportional to the potential difference existing between the grid and cathode of the tube 38. In other words, the periodic increase and decrease in capacity of the condenser 34 effects an alternating potential difference across the condenser 32 as well as across the condenser plates 33 and 35, the high resistance 31 introducing a sufficiently large constant in the condenser charging circuit to prevent immediate equalization of the change in potential produced by the change in capacity of the vibrating condenser 34.

It will now be seen that since the A. C. component impressed on the grid of the tube 38, and subsequently amplified by the succeeding amplifier stages, will be in phase or 180° out of phase with the current supplied to the field winding 48 of the motor 45, the motor will be caused to operate in one direction or the other, as explained hereinabove and in my aforesaid application, Serial No. 74,895. That is, the current then supplied by the output secondary 41 of the amplifier will differ in phase, one way or the other, from the electromotive forces normally induced in the shading coils of the motor, so that the shading coils will be no longer opposed in electrical effect, but will coact to cause rotation of the rotor and consequent displacement of the potentiometer contact arm 22. The arm 22 will accordingly be adjusted in position until the potentiometer introduces a counter-voltage which will balance the floating grid potential of grid 36; and when such balance is achieved, i. e., when the difference between the grid and potentiometer voltages becomes zero, the modulating effect of the vibratory condenser 34 disappears and the motor and its driven instrumentalities come to rest.

Ordinarily, it may be desirable to effect this initial balance or zero-set of the apparatus by means other than a preliminary adjustment of the arm 22. To that end, for example, the arm 24 may be manually adjusted to provide sufficient counter voltage (across the then included portion of resistor 23), leaving the arm 22 at, say, its zero position 26. It will be appreciated that the polarity of the voltage source 25 is so arranged that when the contacts 22, 24 are separated, it opposes the normal bias, usually negative, on the grid 36. Similarly when the electrode 28 or other unknown source is inserted in the circuit as shown, it is conveniently arranged so that it normally opposes, in polarity, the potential between arms 22 and 24.

It will now be readily understood that if such electrode or other unknown source of electromotive force is interposed in the otherwise balanced input circuit at 28, a modulated, i. e., alternating or pulsating potential difference will be produced across the input of the tube 38, by the action of vibrating condenser 34 and input condenser 32 as heretofore explained, and will cause the motor 45 to run, and move arm 22, in such direction as to build up a counter-voltage on the potentiometer 20 equal and opposite in value to the voltage of the unknown source 28. Since the potentiometer may be readily calibrated, as will be understood by those skilled in the art, and since the potentiometer is synchronized with the pointer or other movable element of the device 46, the unknown electromotive force may be read directly on the latter in terms of voltage, i. e., volts, millivolts, or other units. Should the voltage of the unknown source 28 change in either direction, the arm 22 and the pointer of the indicator 46 will be correspondingly automatically adjusted so as respectively to compensate for and indicate the change.

It will be appreciated that if desired, a variable or fixed resistance (not shown) may be inserted in series between one side of the battery and one end of either of the resistances 21 or 23, so as to provide a variation of the "spread" or range of movement of the potentiometer arm 22, relative to that afforded by resistances 21 and 23 as originally selected.

When made with tubes, condensers and like parts now commercially obtainable, it is greatly preferable that all parts of the system be thoroughly shielded, both electrostatically and at many points magnetically. For instance, the complete voltmeter apparatus, or at least the input elements and the amplifier 37, are preferably enclosed in a heavy sheet metal case made of iron or other magnetic shielding material, as indicated by the dotted lines 30, 52. It is also preferred to interpose an electrostatic and magnetic shield made, for instance, of ferrous material, between the input tube 38 together with its circuit, and the remaining parts of the amplifier, as indicated by the dotted line 53—so as to shield the first-mentioned elements from the influence of the other tubes, transformers and amplifier components which are capable of producing undesirable induced electromotive forces. The vibratory condenser may also be similarly shielded with its enclosing box 34. It is especially preferable that the input circuits of the apparatus be shielded from any inductive effect of the electromagnetic driving mechanism of the vibratory condenser; to that end, the mechanism is enclosed in a heavy walled or multi-walled box 54 of ferrous metal, and the oscillatory condenser plate 35 is actuated by a non-magnetic wire or rod 55 or by a rod of insulating material, projecting through a small opening in the wall of the box 54. Advantageously, the potentiometer device may be likewise shielded with its box 20, and the indicating or recording mechanism including the motor 45, may be enclosed in a magnetic and electrostatic shield 56, and preferably separated from the other elements of the voltmeter, although for convenience of illustration, such separation is not shown in the drawings.

The conductors 57, 58, whereby alternating current is supplied to the condenser vibrating mechanism, are preferably twisted together so that their fields tend to cancel, and they are preferably enclosed in ferrous tubing (not shown) at all points inside of the case 54. Any alternating current supply leads extending to the amplifier 37, such as cathode or filament heater leads, can be similarly twisted and shielded.

In view of the extremely high resistance of the input circuit of the voltmeter, careful insulation of the input instrumentalities is very desirable. To that end, for example, the socket for mounting the tube 38 can be made of non-hydroscopic insulating material, such as amber, hard rubber, or the material commercially known as "Isolantite"; and likewise the insulator 29, the supports for the resistances and for the stationary plate 33 of the vibrating condenser, and the mountings for the plate assemblies of the condenser 32, which may be of the air dielectric type.

Satisfactory operation has been obtained where the amplifier 37 derives its power supply from rectified and filtered direct current as obtained from regular commercial A. C. power lines. More accurate results are usually possible if the so-rectified and filtered voltages applied to the first tube 38 are obtained from an A. C. source that has its voltage regulated by a magnetic saturation type voltage regulator; or if the screen and plate voltages of the tube 38 are maintained substantially constant by a gaseous voltage regulator tube, such as the type known as R. C. A. 874. In many instances, a "B" battery may satisfactorily provide the high voltage supply for this first amplifier stage, since the required current is of very small value.

In general, it is preferable to locate the potentiometer 20 at the "low" or ground side of the unknown source 28, as shown, so that the potentiometer is prevented from acting as a collector of electrostatically induced potentials. In some instances, such pick-up can be further reduced and additional stabilization effected by inserting a by-pass condenser 60 between the "high" side of the potentiometer and ground, the optional connection of this condenser being indicated by dot and dash lines.

Under certain conditions, however, it may be necessary to connect the potentiometer device 20 in the "high" side of the circuit from the electrode 28. In such cases, the potentiometer elements 21—22—23—24—25 can be mounted within the shielded voltmeter casing 30—53, and mechanically connected to the mechanism of motor 45 by a properly shielded and insulated external linkage.

The potentiometer device shown at 20 in Fig. 1 is adapted, as is usually the case with potentiometer recorders, for measurement of potentials which are variable from zero in one direction only, i. e., where the contemplated variation of voltage at source 28 would not include a reversal of polarity; and the end of the slide wire resistance 21 (point 26, when the zero-set contact 24 has been properly adjusted) may thus conveniently coincide with the zero position of the indicator pointer or recorder pen arm. In some cases, however, the voltage variation of the source 28 under test may pass through zero, so to speak, and involve a reversal of polarity—for instance, when certain cells or electrodes are used for the measurement of pH, wherein the point of zero voltage does not represent the minimum of pH value. Under such circumstances, a convenient potentiometer arrangement is that shown in Figure 5, wherein one end of the battery 25 is connected to the variable contact 24, rather than to the end of the resistance 23, and a supplemental resistance 61 is connected across the battery, with a variable contact 62 which is connected to ground in lieu of the connection from contact 24 in Fig. 1. It will now be seen that by preliminary adjustment of the slider 62, a point of zero potential can be found for the potentiometer arm 22 at any desired point intermediate the ends of resistance 21 (the arm 22 being connected to one side of the electrode 28 as shown in Fig. 1). That is, the potentiometer can be preset with an intermediate zero point so as to afford the desired balancing effect against an unknown force which may vary through zero as previously explained. At the same time, the adjustment of arm 24 on resistance 23 provides for zero-set with respect to the floating grid potential of the tube 38, as heretofore described.

The additional resistance arm 24 in the potentiometer of Fig. 5 may also be used, if desired, to adjust the "spread" or voltage limitations obtainable with contact arm 22 on resistance 21, as the apparatus is used with a given unknown source 28.

Figs. 2, 3 and 4 illustrate a suitable form of vibratory condenser 34 as shown diagrammatically in Fig. 1. The parts are mounted on a relatively heavy or massive base 64, which will provide a suitable platform for the resonated vibrating structure. The fixed plate 33 of the condenser has a horizontal flange whereby the plate is carried by a stud 65 of amber, hard rubber, "Isolantite," or the like. The vibrating plate 35, which is preferably rigid and non-flexible, has one end fastened to a flat suspension spring 65a which is clamped in a suitable upright support. One or more slidable weights, such as weight 66, may be adjustably clamped on the plate 35, so that resonance of the vibrating system at the desired supply frequency may be accurately obtained. The horizontal flange of the stationary condenser plate is adjustably carried by the support 65 with a slot and screw arrangement, as shown, so that the spacing and relative positions of the two condenser plates may be easily adjusted.

The electromagnetic driving parts are enclosed in the magnetically shielded box 54, as previously described. The bi-polar electromagnet 50 has its winding 67 connected to the A. C. supply line, as explained, and the rigid armature 51 for this magnet conveniently comprises a permanent magnet having its poles at its ends, and mounted for vibration at the end of a flat spring 68 which is in turn suitably carried by an upright clamp, as shown. The armature 51 carries a longitudinally adjustable weight 69, like the weight 66 on condenser plate 35, for accurate adjustment of the natural period of vibration. Drive of the condenser plate 35 is effected by the member 55 which is securely coupled or clamped at its ends to the armature 51 and plate 35 respectively. The electromagnet 50 is supported from the base 64 by an appropriate supporting element 70 of non-ferrous material, and extreme oscillation of the device may be prevented with the adjustable stop screws 71, 72, on either side of the outer end of the armature 51, the screws 71, 72, being appropriately tipped with rubber or leather bumpers 73.

It will now be understood that with the use of a polarized, i. e., permanent magnet armature 51, the arrangement is such that the poles of electromagnet 50 simultaneously attract or simultaneously repel the adjacent portions of the permanent magnet, in accordance with the direction of current flow through the winding 67. Accordingly the vibratory system makes one cycle of mechanical oscillation for each cycle of current flow through the winding 67, and not only is proper phase relationship always maintained, but also, for example, if the line current is at 60 cycles, the condenser will be vibrated at 60 cycles (rather than 120 cycles). In general, where the line frequency is at least reasonably constant, it is presently preferred to use a vibrator system that is mechanically resonant to the line frequency, and the design of the described elements and the adjustment of the weights 68, 69, may then serve that purpose. In such cases, the current required to energize the electromagnet 50 is comparatively very small, and external or stray magnetic fields are minimized so as to avoid disturbing effects upon the other apparatus.

However, in some cases it is desirable to use a vibratory system which has a natural period markedly different from that of the supply system, i. e., from that at which it is driven, and the mechanism may be readily designed, or provided with appropriate loading or damping means, or otherwise adjusted, to that end. Ordinarily, the chief reason for using a non-resonant system is in case the A. C. line is poorly regulated in frequency, because if the device is then sharply tuned for mechanical resonance to the supposed line frequency, it tends to keep its frequency of vibration constant while the line frequency varies considerably back and forth As a result, the phase relation between the line current and the modulation produced by condenser 34 may shift appreciably from time to time; and where, as shown, the motor 45 is phase controlled, the sensitivity of the apparatus may be impaired.

If desired, sources of voltage 25 other than a standard cell may be employed, and arrangements of a type heretofore used with other potentiometers, and therefore not shown, may then be used for periodically and automatically checking the calibration of the potentiometer against a standard cell. However, unlike previously available devices, the input circuit of the present apparatus draws practically no current at any time, even in the potentiometer network, and it is therefore entirely feasible to employ a standard cell, or battery of standard cells, continuously as the source of voltage 25. It will be understood that the resistance of the potentiometer may thus be very high—of the order of 25,000 ohms—so as to avoid any appreciable current flow from the standard cell.

Figure 6:
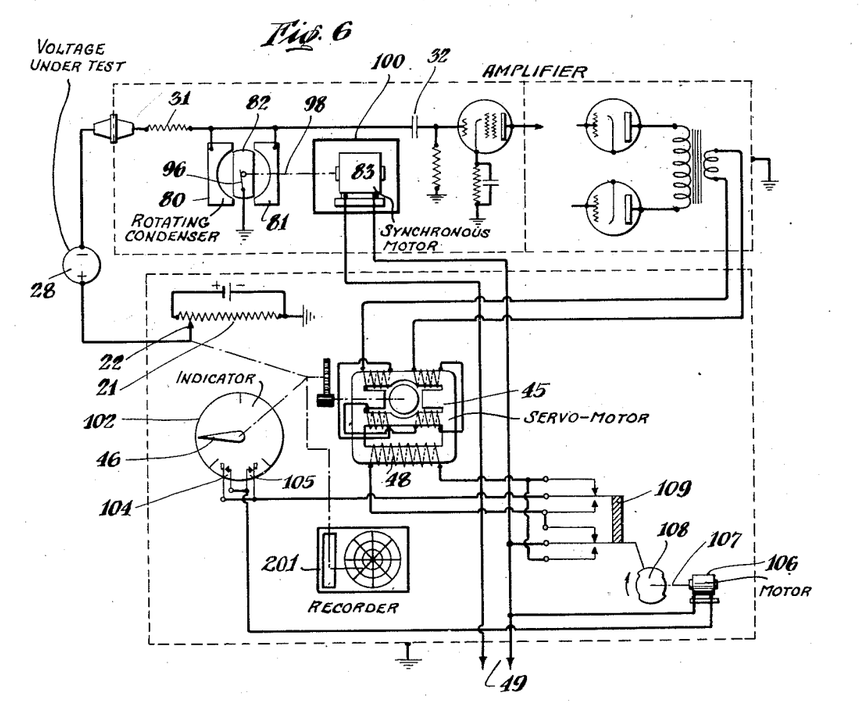
Fig. 6 is a modified form of voltmeter system.

In Fig. 6 a somewhat modified form of the invention is illustrated, wherein a rotating condenser is employed for modulating and phasing the unbalance voltage, in lieu of the vibrating condenser 34 of Fig. 1; other elements being generally the same as in Fig. 1. The rotating condenser comprises a pair of stationary plates 80, 81, each forming part of a cylinder, and a double-faced rotary plate 82 driven by suitable means such as a synchronous induction motor 83. For example, if the A. C. line frequency is 60 cycles per second, and the synchronous motor 83 is therefore (as is usual) adapted to run at 1800 revolutions per minute, it will be seen that the capacity between the stationary plates 80, 81, and the rotary plate 82 varies to a maximum (and minimum) 60 times per second—a rate of capacity variation similar to that of the vibrating condenser 34 in Fig. 1.

Figures 9, 10, 13:
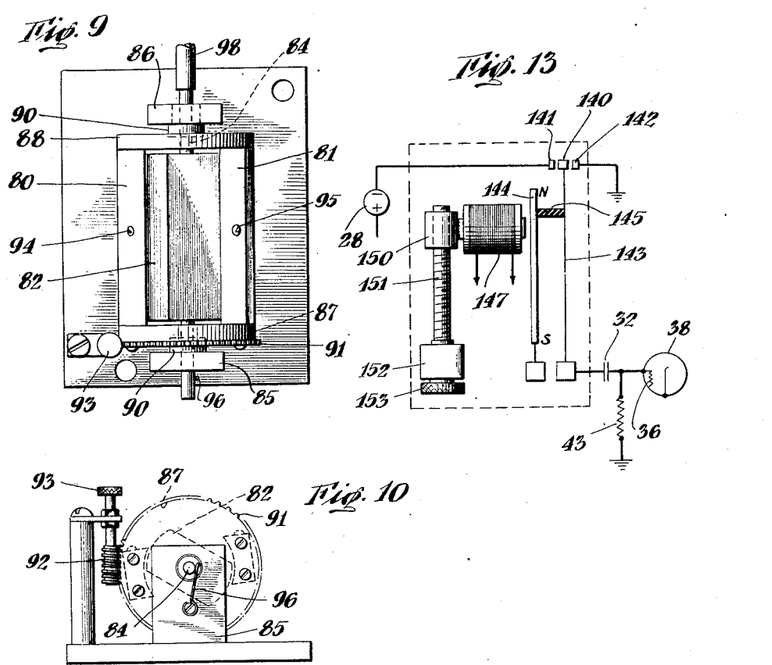
Figs. 9 and 10 are respectively plan and end elevation views of a rotating condenser suitable for use in Figs. 6 and 7.
Fig. 13 is a schematic view, with certain wiring connections, of a modified circuit-controlling device useful, for example, in the arrangement of Fig. 11.

The rotating condenser is more fully illustrated in Figs. 9 and 10, wherein it will be seen that the balanced aluminum rotor 82, or like condenser element having opposite faces of cylindrical configuration, is carried on a shaft 84, which is journaled for rotation in suitable bearings, such as ball-bearings, in the support posts 85, 86.

The stationary condenser plates or members 80, 81, which have concave faces shaped to conform with the cylindrical faces of the rotor 82 in spaced relation therefrom, are carried by and between a pair of end plates 87, 88, made of insulating material, such as hard rubber, amber or "Isolantite"; the clearance between the stationary plates 80, 81, and the curved surfaces of rotor 82 being conveniently, for example, about .005 inch. Each of the support posts 85, 86, carries on its inner face a circular boss 90, which is concentric with the shaft 84 and which has a central aperture through which the shaft passes freely. The end plates 87, 88 are rotatably carried on the bosses 90, so that the stator assembly of the condenser may be rotated about the axis of the rotor, for adjustment as hereinafter described. One of the end plates, such as plate 87, is provided with gear teeth 91 about its periphery and a worm 92 is disposed in engagement with the teeth so that upon rotation of the knob 93, which is mounted on the shaft of the worm 92, the desired rotative adjustment of the stator assembly is effected.

Suitable terminal screws 94, 95 may be provided in the stator elements or plates for circuit connection thereto, and a brush 96 is mounted on one of the support posts 85 to make contact with the shaft 84, for connection to the rotor. To reduce contact potentials and resistances, the brush 96 may be made of spring silver and arranged to make contact with a ring of similar metal (not shown) on shaft 84.

The rotor 82 is driven from the motor 83 (see Fig. 6) by a suitable coupling element 98 of insulating material connected to the shaft 84. Preferably, the motor 83 is both electrostatically and magnetically shielded, for example, with a heavy iron box 100 similar to the shielding 54 of the vibrating mechanism in Fig. 1.

Figure 7:
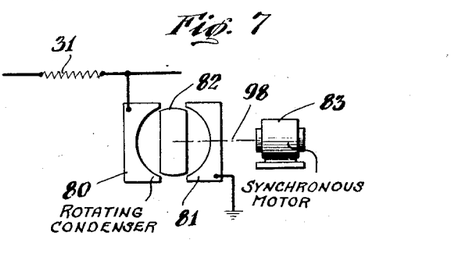
Fig. 7 illustrates an alternative connection of a rotating condenser such as shown in Fig. 6.

Instead of connecting the rotating condenser as shown in Fig. 6, with the rotary plate grounded and the stationary plates both connected to the amplifier input lead intermediate resistance 31 and condenser 32, the arrangement shown in Fig. 7 may be used—wherein one of the stationary plates is connected to the input line and the other is connected to ground, providing in effect two variable condensers in series rather than two condensers in parallel as in Fig. 6. It will be seen that the arrangement of Fig. 6 provides greater capacity, whereas that of Fig. 7 obviates the brush 96 or other connection with the rotary plate, thus eliminating the effect of contact potentials and varying contact resistance at this point in the circuit.

It will be understood that the system shown in Fig. 6 operates in fundamentally the same manner as that of Fig. 1, the rotating condenser performing the same function as the vibrating condenser of Fig. 1. For simplicity of illustration, the potentiometer arrangement in Fig. 6 (and likewise in Figs. 11, 14 and 15, hereinafter described) includes only a single resistance element 21, with one end connected directly to ground instead of through a supplementary zero-set resistor. The arrangement of Fig. 1, or that of Fig. 5, or any other suitable potentiometer arrangement may, of course, be employed in Fig. 6 (and in Figs. 11, 14 and 15).

When a conventional synchronous induction motor 83 is used as in Fig. 6, there is always the possibility that it will lock in step at such time that the rotor of the rotating condenser is 180° out of phase from its proper or desired relationship to the alternating current which energizes the field winding 48 of the potentiometer motor 45. When such mis-phase occurs, so to speak, the effect will be that the movable arm 22 of the potentiometer is driven in a direction opposite to that required for restoring balance; and in consequence, the indicator arm 46 will be rotated past the calibrated portion of the indicator scale 102. Automatic correction for such mis-phase of the motor 83 may be obtained with the instrumentalities now to be described, including two sets 104, 105, of normally open contacts conveniently disposed on the indicator, and respectively arranged so that one or the other of the sets of contacts 104—105 will be closed by the indicator arm 46 when the latter is driven to the end of the scale in one direction or the other (as upon mis-phase of motor 83). A small alternating current motor, for example a clock motor mechanism 106 adapted to drive its shaft 107 at one revolution per minute, is connected across the A. C. supply line 49 whenever contacts 104 or 105 are closed. The shaft 107 is connected to drive a cam 108 of a reversing cam switch, generally designated 109, which is of the double-pole, double-throw type, and so arranged as to reverse the connections of the motor winding 48 with the supply line 49, depending upon the position of the cam 108.

Thus when the motor 106 is started by closure of contacts 104 or 105, the cam switch 109 is operated to reverse the connections of the motor winding 48, whereby the instantaneous direction of current flow through this field winding is reversed, and proper phase relation between the motor 45 and the output of the rotating condenser 80—81—82 is restored. Thereupon the motor 45 will immediately, by the normal action of the circuit as hereinbefore described, drive the potentiometer arm 22 in a direction to restore balance, and balance will be restored in true accordance with the value of the voltage at the unknown source 28.

It is desirable that the cam and switch assembly 108—109 have a rapid or snap action upon the closure of the contacts 104 or 105—or in any event, it is preferable that sufficient time elapse before rotation of cam 108 can cause a second operation of the reversing switch 109, so as to permit the potentiometer motor 45 to rotate the arm 46 out of engagement with that set of the contacts 104 or 105 which it has just previously closed; it being understood that as soon as the arm 46 moves away from the contacts (104 or 105), the latter are opened and the cam switch motor 106 stops. To provide the preferred cam switch operation as just described, the arrangement shown in Fig. 8 may be advantageously employed.

Figure 8:
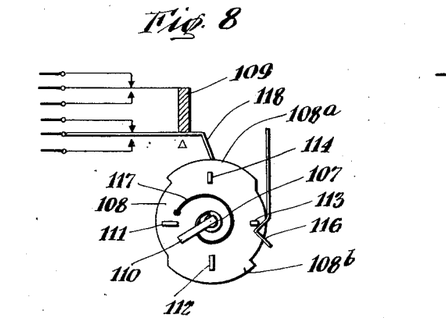
Fig. 8 is an enlarged view of certain switch-controlling structure shown in Fig. 6.

Referring to Fig. 8, the cam 108, having for instance two high spots 108a, 108b, floats on shaft 107, which carries a radially extending pin 110. A plurality of detents 111, 112, 113, 114, are carried by the surface of cam 108 so that the inner ends of at least two of the detents 111, 112 are in the path of pin 110. A lock-spring 116 releasably engages one of the detents, and a spiral spring 117 under tension is connected at one end to shaft 107 and at the other end to cam 108, so that when motor 106 is energized (see Fig. 6) and starts to drive shaft 107 slowly in a clockwise direction, the spring 117 is wound up until the pin 110 strikes the detent 111. The cam is then positively displaced in a clockwise direction, and the detent 113 is snapped past the spring 116; whereupon the energy stored in the spiral spring spins the cam further around, ahead of the rotation of shaft 107, until detent 114 strikes the holding spring 116 and the cam stops. Thus the cam is rapidly and effectively given a quarter-turn, so that the follower 118 has moved promptly from a high spot 108a to a low spot; and the effect of this prompt operation of the reversing switch 109 by follower 118 is to cause clean displacement of the indicator arm 46 (see Fig. 6) away from contacts 104 or 105, as explained hereinabove, so that the motor 106 is turned off before its slow rotation can again advance the pin 110 against detent 111.

While other instrumentalities might be used for the same purpose (as will now be understood by those skilled in the art), a cam operated reversing switch of the motor driven type, such as shown in Figs. 6 and 8, is particularly advantageous and is at present preferred, because of its simplicity. Furthermore, if a rotating condenser is used instead of a vibrating condenser, the cylindrical plate type illustrated in Figs. 9 and 10 is at present preferred, chiefly because it is simple and may be easily designed for rotation at any desired speed without vibration; but in some cases, other types may be employed, such as the arrangement of interleaving plates commonly used in conventional variable condensers.

Figures 11, 12:
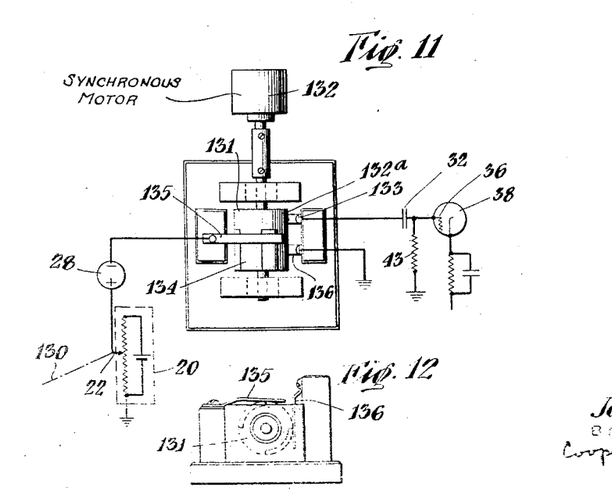
Fig. 11 is a view of part of a voltmeter system such as shown in Figs. 1 or 6, with certain modifications, including a commutator device shown in plan view.
Fig. 12 is an end elevation of the commutator device of Fig. 11.

Fig. 11 illustrates a further modified form of voltmeter, wherein a rotary commutator is connected in circuit intermediate the condenser 32 and the unknown voltage source 28, for alternately charging and discharging the condenser 32 by the difference between the voltage of the source 28 and that of the potentiometer 20. For convenience of illustration, only the directly adjacent circuit elements are shown in Fig. 11, it being understood that the output of the tube 38 is connected, through further amplification, to effect operation of a motor which by a mechanical connection 130, drives the potentiometer arm 22, exactly as in the case of Fig. 1 or Fig. 6.

The commutator of Fig. 11 (see also Fig. 12) includes a rotor 131, driven, for example, by a synchronous motor 132 which may be connected and housed in the same manner as the motor 83 in Fig. 6. The rotor 131 has an annular conducting portion 132a to which contact is continuously made by a brush 133 connected to condenser 32 as shown. Also carried on the surface of rotor 131, and connected with the ring 132a, are a plurality of circumferentially spaced conducting segments 134, with which contact is successively made by each of the brushes 135 and 136, the latter being respectively connected to the unknown source 28, and to ground, as shown. The arrangement of the commutator and its brushes is thus such that the condenser 32 is connected first to the "high" side of the source 28 and then to ground, so as to charge and discharge twice for each revolution of the motor 132—e. g., sixty times per second if the motor is making 1800 R. P. M. on a 60-cycle line. As in the case of Fig. 6, the use of the synchronous motor 132 affords a likelihood of mis-phase when it is first started, and it will therefore be understood that automatic correcting instrumentalities, such as shown in Figs. 6 and 8, may be similarly included in the system of Fig. 11.

It will now be understood that the system of Fig. 11 operates in a manner generally similar to the systems of Figs. 1 and 6: since the magnitude and direction of the condenser discharge, i. e. discharge of condenser 32, determines the value and phase of the alternating electromotive force applied to the grid 36 of the tube 38, and since the rotating commutator 131 is phased properly with the current applied to the field of the potentiometer motor (e. g. motor 45 in Fig. 1), the output current from the amplifier causes automatic adjustment of the potentiometer to a point where balance with the unknown electromotive force 28 is established.

Fig. 13 illustrates a somewhat modified arrangement to be used, for example, in lieu of the commutator device shown in Figs. 11 and 12. In Fig. 13, a vibrating contact element 140, which is connected through the condenser 32 to the grid 36 of the input tube, alternately engages contacts 141 and 142, contact 141 being connected to the unknown source 28, like the brush 135 in Fig. 11, and contact 142 being connected to ground, like the brush 136 of Fig. 11. It will be understood that the remaining elements of the voltmeter system may be similar to those shown, for example in Fig. 1. The vibratory arm 143 which operates the contact element 140 is mechanically connected to a permanent magnet armature 144, by an insulated rod 145, and the armature 144 is suitably spring mounted, as shown, for vibratory drive by an electromagnet 147 which is connected to the A. C. line as in the case of the electromagnet 50 in Fig. 1. The polarized vibrating unit thus constituted will operate at line frequency, like the vibrating condenser plate 35 in Fig. 1, so that condenser 32 will be charged (and discharged) at the line frequency, as in Fig. 11; it being now appreciated that the voltmeter including the parts of Fig. 13 will operate in a manner generally similar to the system of Fig. 1.

It has been found that improved sensitivity may, in many cases, be obtained by careful adjustment or design to obtain optimum phase relationships between the currents supplied to the shading coils of the potentiometer motor 45 (Fig. 1) and the line current supplied to the field winding 48 of that motor. With the apparatus of Fig. 13, for example, satisfactory adjustment in this respect can be had by changing the position of the electromagnet 147 with respect to its permanent magnet armature 144, i. e., by displacement of the electromagnet pole or poles lengthwise of the armature and hence relative to the poles of the latter. To that end in Fig. 13 the electromagnet 147 is carried by an interiorly threaded bushing 150 which is traversed by a screw 151 suitably journaled in a fixed stud 152, whereby manual rotation of the knob 153, carried by the screw, will displace the electromagnet in the manner described. It will be appreciated that similar adjusting means may be included in the condenser-vibrating mechanism of Figs. 1 to 4 inclusive, to displace the electromagnet 50 longitudinally of the permanent magnet armature 51, whereby optimum phase relationship may be obtained between the modulating vibrations of condenser plate 35, and the current supplied from the line to the motor winding 48.

Other arrangements (not shown) for obtaining such phase adjustment in the case of apparatus of the type shown in Fig. 1, comprise: insertion of a phase-changing bridge, such as illustrated in Fig. 14, in the circuit between the A. C. line 49 and the winding 67 of the electromagnet 50; or, in some cases, the simple insertion of a properly selected condenser in series with windings 67, i. e. in one of the leads 57, 58. Although other means may be employed, corresponding and highly accurate phase regulation may be easily obtained in the apparatus in Figs. 6, 9 and 10, by turning the thumb screw 93 to vary the location of the stationary condenser members 80, 81, circumferentially in relation to the position of the rotor 82 at a given instant.

Certain further modifications of the invention are illustrated in Figs. 14 and 15, particularly including arrangements for using more or less conventional types of recording potentiometers in lieu of the arrangement shown in Figs. 1 and 6, whereby a shaded pole motor is employed to operate the potentiometer arm 22 and the indicator 46, recording pen or the like.

In general, a number of the elements illustrated in Figs. 1 and 6 are similarly employed and identified in Fig. 14, and, therefore, need not be again described. In Fig. 14, however, a conventional loud speaker unit 160 is shown for driving the vibrating condenser 34, the usual diaphragm-operating element of the unit being attached, by a suitable connection 161, to vibrate the moving condenser plate 35. Any one of a number of commercially available types of loud speaker units, of the magnetic type, may be employed for this purpose, and when the movable or fixed driving coil 162 of the speaker is connected across the A. C. supply line 49 (if desired, through a phase-controlling arrangement as shown and hereinafter described), the condenser 34 will be vibrated at the frequency of the line. The resulting operation is very effective, and in some respects this arrangement is even more satisfactory than that of Figs. 2 to 4 inclusive.

The recording or indicating potentiometer unit, generally designated by the box 163, includes a potentiometer 21, voltage source 25, and movable contact arm 22, arranged and connected as in the foregoing embodiments of the invention, for example, as in Fig. 6. A suitable indicator 46a (or recording pen, or both) is associated with the potentiometer arm 22 to be moved with the latter for indication of its displacement, on a scale 164. The movable elements 22—46a are driven by instrumentalities (for example, such as used in the known types of recording potentiometers—hence not shown) under control of the swinging boom 165 of a sensitive moving coil galvanometer unit, comprising a permanent magnet 166 and a movable coil 167.

As in the case of Fig. 1, the input circuit of the voltmeter, through the condenser 32, extends to the control grid 36 of the first tube 38 of an amplifier generally designated by the box 168, it being understood that these and associated elements, including the vibrating condenser 34, are appropriately shielded, as heretofore described in connection with Fig. 1. Although other types of amplifiers may be satisfactorily employed in many cases, it has been found desirable to employ a two-stage amplifier 168 including a single pentode or five-element type of vacuum tube in each stage, e. g. the tube commercially known as R. C. A. 6J7. The output of the amplifier 168, i. e., the plate or anode lead from the second tube 169, is connected through a suitable condenser 170, for example, having a capacity of 0.1 microfarad, to one side of a resistor 171, and also to a center tap of the secondary 172 of a transformer 173 which has its primary connected across the A. C. line 49. This transformer, which may be conveniently of the step-down variety to afford the appropriate low voltage for vacuum tube control, has the ends of its secondary 172 respectively connected to the control grids of a double-grid double-plate vacuum tube 175. It will be understood that although it is presently preferred to employ a tube of the type just described, e. g., the tube commercially known as R. C. A. 6A6, other arrangements may be employed, such as a pair of tubes similarly arranged to operate in pushpull. The opposite end of the resistor 171 is connected to ground, so that an alternating electromotive force is impressed across the resistor whenever there is a voltage unbalance, and consequent modulated electromotive force, in the input circuit of the tube 38.

It will now be understood that the alternating voltage thus produced across resistor 171 will bear a definite phase relationship with the electromotive force impressed on the grids of the tube 175 from the secondary 172 of transformer 173, since the latter is energized from the A. C. line 49, which also energizes the vibratory modulating condenser 34. The plates of the tube 175 are respectively connected to the ends of an output resistor 180, conveniently comprising a potentiometer, of say 25,000 ohms resistance; the potentiometer 180 having a center tap 181—conveniently adjustable to obtaining optimum accuracy and sensitivity—which is connected to the positive side of the high voltage plate supply 182 for the tube 175. The moving coil 167 of the galvanometer unit is also connected across the resistor 180. It will now be appreciated that when no voltage appears across the resistance 171, i. e., when the input of the tube 38 is in balance, the alternating electromotive force applied to one grid of the tube 175 by the transformer 173 will be equal in value to that applied to the opposite grid of the tube 175 by the same transformer on the next alternation of the cycle. As a result, the average flow of current through the output resistance 180 will be the same in both directions (i. e., through both plates), and consequently there will be no prolonged voltage unbalance or difference of potential between the extremities of resistance 180.

When, however, an electromotive force is produced across the resistance 171 (as by reason of the introduction of an unknown source 28 or by change in the potential of such source) it will be in phase with the voltage across one half of the secondary winding 172 (at one grid of tube 175) and 180° out of phase with the voltage across the other half of the secondary winding (at the other grid of tube 175). In consequence, more current will flow through one triode section of the tube 175 than through the other section, i. e., more current through one plate than the other, with resulting production of a constant or average difference of potential between the ends of the resistor 180. Since that voltage is applied to the movable galvanometer winding 167, the latter is deflected, displacing its boom and, through instrumentalities not shown, readjusting the potentiometer arm structure 22—46a in a direction to restore balance.

When balance is thus restored, there will be no alternating electromotive force applied to the grid of the input tube 38 and consequently no alternating electromotive force across the resistor 171, and both triode sections of the tube 175 will again conduct equal amounts of current, so that the galvanometer is no longer deflected. It will be understood that as is usual in such recording or indicating galvanometers, the displacement of the potentiometer arm by the galvanometer boom is accomplished through a depressor bar and motor drive (not shown), or through some other one-way coupling mechanism, whereby successive deflections of the galvanometer cause progressive displacement of the potentiometer arm in the corresponding direction, without return movement of the latter upon restoration of the galvanometer coil to its original position after deflection.

It will be understood that the movement of the galvanometer boom to adjust the potentiometer arm 22—46a will be in the proper direction to restore balance, being dependent upon the direction of unbalance in the output of the tube 175, i. e., dependent upon the polarity of the voltage across the resistor 180, which in turn is governed by the direction of unbalance in the input circuit of the amplifier 168.

To provide for phase adjustment, i. e., to afford optimum phase relation between the amplifier input control by the vibrating mechanism 160 and the current supplied by the line 49 to the indicating and balancing instrumentalities, a phase-changing bridge is illustrated in Fig. 14, also useful in other embodiments of the invention, as in lieu of the mechanical phase-controlling arrangements previously described. A transformer 184 has its primary connected across the line 49, and has a secondary provided with a center tap 185. The extremities of the secondary extend to a fixed condenser 186 and a variable resistor 187, the other sides of the condenser and resistor being connected at the point 188. The coil 162 of the vibrating mechanism is connected between center tap 185 and point 188, i. e., across the resulting bridge in the transformer secondary circuit. As will now be readily understood, it is possible, by varying the resistor 187 in one leg of the bridge, to shift the phase of the current applied to the winding 162 through approximately 180 electrical degrees.

Fig. 15 illustrates an alternative construction of certain parts in Fig. 14. In Fig. 15 the galvanometer is replaced with an electrodynamometer, which is essentially a galvanometer having instead of a permanently magnetized field, or a field locally magnetized in one direction, a field core 190 provided with a field winding 191 to be energized from the alternating current line. In such case, the double-triode amplifier tube 175, together with its input transformer 173 and output resistance 180 may be omitted, and the terminals of the winding 191 may be connected across the A. C. line 49 at the points 192, 193 (see also Fig. 14) instead of the primary of transformer 173. The coupling resistor 171 may also be omitted, and the moving coil 167a of the electrodynamometer is connected to the output of the amplifier 168. Since the coil 167a is preferably of low impedance, whereas the output circuit of the amplifier ordinarily has a high impedance, a matching transformer 194 may be employed, its secondary being connected across the moving coil 167a of the electrodynamometer, and its primary being connected between ground, as shown, and the output lead of the amplifier 168 at the point 195 (see Fig. 14). The other elements of the circuit may be conveniently the same as in Fig. 14, including the arrangement and connection of potentiometer 21—25, and its operation by the electrodynamometer boom 165.

If in Fig. 15 no alternating electromotive force is applied across the moving coil 167a, i. e., if the input circuit of the voltmeter system is in balance, there will be no deflection of the instrument, since no reaction will take place between the coil 167a and the alternating magnetic field produced by the winding 191. However, when there is an unbalance in the input circuit of the system (as previously described), an alternating current will flow through the movable coil 167a, by reason of the alternating electromotive force then set up in the output of the amplifier 168. Since this current in coil 167a is of the same frequency as the line current which energizes the winding 191, reaction occurs between the field of the galvanometer and the coil 167a so that the latter and its boom 165 are deflected either to the right or left depending upon the phase relation between the current in the field winding and that in the moving coil—such phase relation and amplitude of deflection being determined, as will now be understood, by the direction and amplitude of unbalance in the input of the amplifier 168. The operation of the apparatus shown in Fig. 15 is thus in many respects similar to that of Fig. 1; and as in Fig. 14, the deflection of the galvanometer boom will drive the potentiometer arm 22—46a in the direction to restore balance, and movement of the arm will cease when balance is restored.

It may be noted that, as may be useful in some cases, the arrangements exemplified in Figs. 14 and 15 can be adapted for operation as straight indicator systems, i. e. systems not necessarily of the potentiometer or like types wherein a known voltage is balanced against an unknown voltage. Thus, for instance, the cell 25 and the potentiometer slidewire 21 may be omitted, and the unknown voltage source 28 may be simply connected to the voltmeter (e. g., the lower terminal of source 28 connected directly to ground), with such change in circuit constants and the like— readily determined by those skilled in the art— as may be necessary. In the resulting system, the galvanometer pointer (Fig. 14) or electrodynamometer pointer (Fig. 15) will be deflected in a direction indicative of and through an arc corresponding to the value of the electromotive force being obtained from the cell 28 or other source of voltage under measurement.

It will now be appreciated that the present invention affords a voltmeter system of extreme sensitivity and reliability, and at the same time a system which requires practically no current for its operation, either from the unknown voltage source under test, or from the calibrating or balancing voltage source included in the potentiometer unit. The system, furthermore, is adapted to provide a positive and continuous indication of the voltage condition of the glass electrode, cell or other unknown source; and not only may a visual indicator be operated automatically, but likewise a recording pen or the like, or other subsidiary apparatus, such as electrical switches, rheostats or other control elements which might be used for control of a manufacturing or kindred process (for example, the motor 45 may operate the control rheostat 200 of Fig. 1 or the recorder 201 of Fig. 6). The operation is positive and substantially dead-beat (particularly so with the apparatus shown in Figures 1 and 6), and all energization of amplifiers and actuating devices may be conveniently obtained from an ordinary alternating current line, without appreciable effect from the usual minor changes in line voltage, frequency or the like.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use within the scope of the appended claims. It will be further understood that while I believe I have correctly stated the theories or laws of science which are followed by the apparatus when it is constructed and operated in the manner described, the invention extends to the means and combinations of means having the described characteristics and set forth in the appended claims, and does not depend upon any presently stated belief or understanding of scientific theory.

It will be understood that where the terms "voltmeter" or "meter" may be used in the appended claims, such terms are intended, unless contrary specification appears, to include not only direct indicating or recording devices, but also like devices (which may not have actual indicating or recording parts) such as for automatic control of manufacturing or kindred processes in accordance with the condition of a source of voltage to be tested.

I claim:

1. Voltmeter apparatus comprising an input circuit adapted to include a source of voltage to be tested and including adjustable potentiometer means for balancing the circuit, a condenser in said circuit and adapted to receive charging voltage therefrom upon unbalance thereof, amplifying means under control of said condenser, means controllable by a source of periodic current for effecting a corresponding periodic variation in the charge of said condenser when the input circuit is unbalanced, whereby the output of said amplifier produces a periodic electromotive force having a phase relation dependent upon the direction of unbalance of said input circuit, and means controllable by said source of periodic current and by said amplifying means for effecting balance-restoring adjustment of the potentiometer means in accordance with said phase relation.

2. The combination of claim 1 wherein the means for causing periodic variation in the charge of the condenser includes a variable condenser associated with said first-mentioned condenser, and means operated by the source of periodic current for periodically varying the capacity of said variable condenser, whereby the charge of the first-mentioned condenser is periodically varied in accordance with the voltage unbalance of the input circuit.

3. The combination of claim 1 wherein means for causing periodic variation in the charge of the condenser includes commutator means controlled by the source of periodic current for periodically connecting and disconnecting said condenser with and from the input circuit.

4. Voltmeter apparatus comprising, in combination, an input circuit adapted to include a source of voltage to be tested and including means for restoring balance of said circuit upon unbalance thereof, a condenser associated with said circuit, amplifying means associated with said condenser and controllable in accordance with the charge thereof, means including a variable condenser associated with said input circuit and having means for periodically varying the capacity of said variable condenser in accordance with a supply of periodic current, to cause periodic variation in the charge of said first mentioned condenser means when the input circuit is unbalanced, and means controlled by the amplifier output for operating the balance-restoring means in accordance with the periodic voltage control of said amplifying means by the aforesaid variation in the charge of the condenser means.

5. Voltmeter apparatus comprising condenser means, vacuum tube amplifier means under control thereof, control means controllable by a supply of periodic current and by a source of voltage to be tested for change, for effecting corresponding periodic variation in the charge of said condenser means with a phase relation to the periodic current dependent upon the direction of voltage change in the tested source, a translating device, and means responsive to the periodic current and to the output of said amplifying means for operating said translating device in accordance with the aforesaid phase relation, the aforesaid control means including periodically operated circuit-controlling elements and means for adjusting the relative position of said elements to vary the phase relation between the periodic charge variation and the periodic current, for maximum response of said device operating means.

6. In voltmeter apparatus, in combination, an input circuit adapted to include a source of voltage to be tested and including means for restoring balance of said circuit upon unbalance thereof, a condenser associated with said circuit, means for effecting periodic variation in the charge of said condenser when the circuit is unbalanced, said last mentioned means having an armature for operating the same, an electromagnet energizable by a source of periodic current to drive said armature, and means for adjusting the relative position of said electromagnet and armature to vary the phase relation between the poriodic current and the periodic variation of the condenser charge, and means including an amplifier controlled by the input circuit for operating the balance-restoring means in response to the phase relation between the periodic current and the periodic voltage variation produced by variation of the condenser charge.

7. Voltmeter apparatus comprising, in combination, an input circuit adapted to include a source of voltage to be tested and including potentiometer means for balancing the circuit, a condenser in said circuit, a vibratory condenser connected across said circuit and adapted to be operated from a source of periodic current, for periodically varying the effective capacity in said circuit, amplifying means connected to said first mentioned condenser, an induction motor having a rotor, a stator energizable by said source of periodic current and a plurality of shading coils normally opposed in electrical effect whereby the rotor is stationary, said shading coils being connected to receive electromotive force from the output of said amplifying means and said rotor being mechanically connected to said potentiometer means, whereby upon unbalance of said input circuit, said potentiometer means is adjusted by said motor in a direction to restore balance.

8. Voltmeter apparatus comprising, in combination, an input circuit adapted to include a source of voltage to be tested and including potentiometer means for balancing the circuit, amplifying means, means responsive to unbalance of said circuit and controlled by a source of periodic current for impressing on the amplifying means a corresponding periodic voltage modified in phase according to the direction of said unbalance, and an induction motor having a rotor adapted to operate said potentiometer means, a stator energizable by said source of periodic current, and a plurality of shading coils adapted to be controlled by the output of said amplifying means, said shading coils being normally opposed in electrical effect to keep the rotor stationary, and adapted to effect rotation of the rotor in a direction to restore balance of the input circuit in accordance with the phase modification of the periodic voltage applied to the amplifying means.

9. Voltmeter apparatus comprising, in combination, vacuum tube amplifying means, means controllable by a source of periodic current and in response to a voltage source to be tested for impressing upon the amplifying means a periodic voltage having a phase relation to said periodic current dependent upon the voltage of the source to be tested, push-pull amplifying means controlled by said first-mentioned amplifying means and by said source of periodic current, whereby the output of said push-pull amplifying means is unbalanced in one direction or the other depending upon the phase relation of said periodic voltage, and a galvanometer device controlled by the output of said push-pull amplifying means.

10. The combination of claim 9 wherein the means for impressing periodic voltage on the first mentioned amplifying means comprises an input circuit adapted to extend to the voltage source to be tested and having potentiometer means for restoring balance of said input circuit, and wherein the galvanometer device includes means for effecting operation of the potentiometer means in accordance with the deflection of the galvanometer.

11. Voltmeter apparatus comprising vacuum tube amplifying means, means controllable by a source of periodic current and in response to a voltage source to be tested for impressing on the amplifying means a periodic voltage having a phase characteristic determined by the voltage of said source, a meter element, and means controllable by said source of periodic current and in response to the output of said amplifying means for operating said meter element in accordance with the phase characteristic of said periodic voltage, said last mentioned means including a galvanometer device having an alternating current stator winding adapted to be energized by said periodic current and a deflection-controlling coil connected for control by the output of the amplifying means.

12. Voltmeter apparatus, comprising, in combination, an input circuit adapted to include a source of voltage to be tested, and including means for restoring balance of said circuit upon unbalance thereof, amplifying means, means responsive to unbalance of said circuit and controllable by a source of periodic current for impressing on the amplifying means a corresponding periodic voltage modified in phase according to the direction of said unbalance, said periodic-voltage-producing means including a periodic circuit controlling device associated with the input circuit and a synchronous induction motor energized by the periodic current for operating said device, actuating means controlled by the output of said amplifying means and in accordance with said phase modification, for operating the balance-restoring means, circuit controlling means responsive to reverse phasing of said induction motor, and control means controlled by said circuit controlling means for causing the actuating means to operate in proper direction to restore balance, irrespective of reverse phasing of the motor.

13. The combination of claim 12 wherein the actuating means is adapted for energization by the source of periodic current, and wherein the circuit controlling means and the control means comprise a reversing switch in the circuit intermediate the source of periodic current and the actuating means, and means responsive to reverse operation of the balance-restoring means and including a quick-response device, for effecting operation of said switch.

14. In voltmeter apparatus, in combination, amplifying means including an electron discharge device having a control electrode, condenser means connected in series with said electrode and having charging means for impressing a D. C. charging potential on said condenser means, including a circuit adapted to extend to a source of D. C. voltage to be tested, associated means for periodically varying the charge of said condenser means, whereby the condenser means impresses upon the amplifying means a periodic voltage in response to the voltage of said source, a translating device, and means controlled by said amplifying means and in accordance with said periodic voltage, for operating the translating device in response to the voltage of said source.

15. In voltmeter apparatus, in combination, amplifying means and control means therefor including condenser means, means periodically varying the capacity thereof, and associated circuit means adapted to include a source of voltage to be tested and establishing a control voltage directly determined by said source, for producing a correspondingly periodic voltage in response to said control voltage, to control the amplifying means, and translating means including means for adjusting the control means to reduce said amplifier-controlling periodic voltage substantially to zero.

16. In voltmeter apparatus, in combination, condenser means, means adapted to include a source of D. C. voltage to be tested, for impressing a D. C. charging voltage on said condenser means in response to change in the voltage of said source, means for periodically modifying the charge of said condenser means to produce a periodic voltage across the latter, and translating means including an electron discharge device controlled by said condenser means and in response to said periodic voltage, for thereby detecting change in the voltage of said source, said translating means including means for effecting adjustment of said means for impressing the charging voltage, whereby the periodic voltage effective for response of said electron discharge device may be reduced substantially to zero by adjustment proportional to the voltage change under test.

17. In voltmeter apparatus, in combination, condenser means, means adapted to include a source of D. C. voltage to be tested, for impressing a D. C. charging voltage on said condenser means in response to change in the voltage of said source, means for periodically modifying the charge of said condenser means to produce a periodic voltage across the latter, and translating means including an electron discharge device controlled by said condenser means and in response to said periodic voltage, for thereby detecting change in the voltage of said source, said periodic charge modifying means comprising variable reactance means connected to control the charge of the condenser means and means for periodically varying the reactance of said reactance means, the voltmeter apparatus also including high impedance means intermediate the condenser means and the voltage-impressing means for inhibiting equalization of the periodically modified charge of the condenser means.

18. In voltmeter apparatus, in combination, condenser means, means including a potential-responsive circuit extending to said condenser means and adapted to include a source of D. C. voltage to be tested, for impressing on said condenser means, in response to change in the voltage of said source, a D. C. charging potential having a polarity dependent on the direction of the voltage change, means for periodically modifying the charge of said condenser means to produce a periodic voltage across the latter, and translating means including an amplifier controlled by the condenser means, for response to said periodic voltage.

19. In voltmeter apparatus, in combination, an electron discharge device having a control electrode, condenser means, a source of D. C. voltage to be tested, control means comprising means for conductively connecting said source, said condenser means and said control electrode, to impress on the condenser means a potential adapted to change upon a change in voltage of the source, means for periodically modifying the potential of said condenser means, whereby the electron discharge device is subjected to control by a periodic potential responsive to the voltage of the source, without appreciable current drain from said source, and translating means controlled by the electron discharge device, for response to the voltage of the source.

20. In voltmeter apparatus for response to a source of D. C. voltage to be tested, in combination, amplifying means having a voltage-responsive input, means adapted to extend to the voltage source for establishing a D. C. potential in response to change in the voltage of said source, and means controlled by said last-mentioned means and including a variable condenser and means for periodically varying the capacity thereof, for converting said D. C. potential into a periodic voltage and for applying the latter to said amplifier input.

21. In voltmeter apparatus, in combination, condenser means, means adapted to include a source of D. C. voltage to be tested, for establishing a D. C. voltage in response to change in the voltage of said source, control circuit means for said condenser means, including high impedance means and means conductively connecting said voltage-establishing means through said impedance means to said condenser means, and means including a variable condenser associated with said circuit means and means for periodically varying the capacity thereof, whereby a periodic voltage is produced across said condenser means in response to the voltage established by the voltage-establishing means, and translating means including an electron discharge device controlled by said condenser means, for response to said periodic voltage.

22. In voltmeter apparatus, in combination, a source of D. C. voltage to be tested, a comparison source of D. C. voltage, a condenser, amplifying means including an electron discharge device having a control electrode, control circuit means for the amplifying means, including means for connecting said control electrode, said condenser, said first voltage source and said second voltage source in series, with said sources in voltage-opposing relation, and means for periodically electrically modifying said control circuit means, whereby in response to change in the voltage of one source relative to the other, a periodic voltage is produced across the condenser and directly impressed on the control electrode for control of the amplifying means.

23. The apparatus of claim 22, wherein the control circuit means includes reactance means and a circuit connecting the same with the condenser to modify the voltage of the latter, and wherein the periodic modifying means comprises means for periodically varying the reactance of said reactance means.

24. The apparatus of claim 22, wherein the condenser is connected intermediate the control electrode and the voltage sources and wherein the control circuit means includes a circuit for modifying the voltage on the condenser, and the periodic modifying means comprises means for periodically interrupting the series circuit intermediate the condenser and the voltage sources, and connecting the condenser to said voltage-modifying circuit.

25. Voltmeter apparatus comprising, in combination, a source of D. C. voltage to be tested, an adjustable source of D. C. voltage adapted to oppose the first-mentioned source, an electron discharge device having a control electrode and an output, means controlled by both said voltage sources and responsive to a difference of their voltages, for applying a periodic voltage to said control electrode, said last-mentioned means comprising means for establishing a control circuit directly connected to said control electrode, including means for conductively extending said control circuit to said sources and associated circuit-modifying means periodically operated under control of a source of periodic current, whereby the aforesaid periodic voltage is directly derived from the voltage difference between the first and second mentioned sources and has a phase relation to the periodic current dependent on the polarity of said voltage difference, and phase-responsive means controlled by the output of the electron discharge device and by the source of periodic current, for adjusting the second-mentioned voltage source to balance the first mentioned source.

26. Voltmeter apparatus for response to variations of a source of D. C. voltage, comprising, in combination, normally balanced means adapted to include said source and to be unbalanced upon variation of the voltage of the source, for establishing a D. C. unbalance potential equal in value to said variation and having a polarity dependent on the direction of said variation, an amplifier including an electron discharge device having a control electrode, means for establishing a control circuit conductively extending to said control electrode and to said voltage-establishing means, means controlled by a source of periodic current for periodically interrupting said control circuit, to cause said amplifier to establish a periodic electromotive force in response to the aforesaid unbalance potential and having a phase relation to the aforesaid periodic current dependent on the polarity of said potential, and translating means including phase-responsive means controllable by the amplifier for adjusting the first-mentioned means to restore balance thereof.

JOHN R. MacKAY.